Patented June 29, 1943

2,322,887

UNITED STATES PATENT OFFICE 2,322,887

CHEMICAL TREATMENT OF PAPER

George L. Schwartz, Wilmington, Del., and Joseph F. Walker, Lewiston, N. Y., assignors to E. I. du Pont de Nemours & Company, Wilmington, Del., a corporation of Delaware No Drawing. Application October 15, 1940, Serial No. 361,268

6 Claims. (Cl. 117—155)

This invention relates to the treatment of papers and, more particularly, to the imparting of certain desired surface and body properties to papers by said treatment.

Starch contributes to paper many valuable properties which cannot be reproduced by other products, but its resistance to water is too low for many paper uses; e. g., in the coating of paper with pigmented compositions a starch adhesive contributes excellent color brightness and high rate of ink absorption. The high color brightness is of value in printing color illustrations and in pastel shaded coatings. The high rate of ink absorption is of great importance in the use of high speed printing where ink must be absorbed almost instantly to prevent smudging when the printed sheet is wound into a roll or piled onto other printed sheets. The water sensitiveness is manifested in various degrees such as in fingerprinting (marking the calendered surface when touched with the fingers) and in poor pasting properties with aqueous adhesives. The water sensitiveness is overcome by the use of large amounts of methylol-melamine and a small amount of catalyst but the good printing properties of the coating are largely lost by this use of large amounts of methylol-melamine; and when smaller amounts of methylol-melamine are used the starch is not rendered water insensitive. This situation is improved somewhat by acidifying the coating composition, but the acids act in a deleterious manner on the coating and paper, and the acids cannot be used in the presence of alkaline pigments. Acids also tend to discolor the paper on aging.

In the manufacture of papers that do not contain pigments, such as greaseproof and glassine papers and towel papers, the wet strength may be increased by coating or impregnating the sheet with adhesives consisting of a high ratio of methylol-melamine to a low ratio of starch and a very low ratio of ammonium salt, such as methylol-melamine, 100 parts; starch, 100 parts; and ammonium sulfate, 5 parts; but the paper is relatively stiff due to a large ratio of methylol-melamine.

It is an object of this invention to develop a method for insolubilizing starch in starch-treated papers on the paper dryer system without drying the paper so severely that it is embrittled and without resorting to high steam pressures to secure the high temperatures essential to reacting formaldehyde with starch. Another object is to develop pigmented coatings that are high in solids content without destroying their ease of operation. Still another object is to provide a method for preparing pigmented coated papers which will retain bright colors. Other objects will be apparent from the following description of the invention.

These objects are accomplished by treating a paper web with an aqueous composition having a pH between 6.1 and 12.5 comprising chiefly starch with a small amount of a water-soluble N-methylol aliphatic nitrogen-containing compound preferably a methylol-melamine and an ammonium salt of a mineral acid, and heating said treated paper to a temperature in excess of 65° C. under conditions that will leave at least 4% moisture in the paper sheet and will bring about an insolubilizing reaction between the starch and the N-methylol compound. Solutions having a pH greater than 12.5 and lower than 6.1 cause degradation of the paper making fibers. The preferred pH range for the non-pigmented compositions is 6.1 to 7.0.

The following examples set forth certain well defined instances of this invention. They are, however, not to be considered as limitations thereof, since many modifications may be made without departing from the spirit and scope of this invention.

Example I

A 50 lb. sheet (24 x 36 x 500 ream) of white, sized, clay-filled paper is coated on the wire side with a chalk slurry to the extent of 4.0 lbs. solids per ream. It is dried by pressing the coated side against the smooth surface of a metal cylinder, which is heated with 20 lbs. gage steam pressure for 60 seconds, using a canvas to hold the sheet firmly against the cylinder. The product is supercalendered to a high gloss which is fingerprint proof and which has a resistance to 360 wet rubs. A corresponding product made under the same conditions with all but one of the ingredients (trimethylol-melamine) has a resistance to 0 wet rubs. The coating composition consists of a commercial chalk from a caustic recovery sludge, 100 parts (dry weight); a cornstarch oxidized to low viscosity, 19 parts; polyvinyl alcohol with saponification number 15 and of medium viscosity, 1.0 part; trimethylol-melamine, 4.0 parts; ammonium chloride, 4.0 parts; and water, 289 parts. The pH of the slurry is 10.5. The trimethylol-melamine is prepared by adding 1 mol of 2,4,6-triamino-1,3,5-triazine to 3 mols formaldehyde as a neutralized 35% solution in water and methanol, heating on a water bath for 15 minutes to dissolve the melamine, cooling rapidly to stop the reaction and then diluting gradually with boiling water until a 5% solution is obtained, and adding cold water until a 3% solution is obtained.

*Example II*

A water leaf web of 30 lbs. ream weight is formed from a Mitscherlich grade of bleached sulfite wood fibers that is beaten to a condition to form a greaseproof paper with density of 17 lbs. per mil per ream. After passing over enough drying cylinders to reduce the moisture content to 45% the sheet is passed between tub-size rolls where both sides are treated with a solution at 35° C. of 6.0 parts starch, 0.4 part polyvinyl alcohol, 1.5 parts dimethylolurea, 1.0 part ammonium sulfate, and 91.1 parts water; and it is then squeezed sufficiently to leave 2% starch in the sheet, based on fiber weight. The sheet then passes over more drying cylinders that are heated by 10 lbs. gage steam pressure until the moisture content is 7%. It is then moistened further by brushing with enough of a solution containing 3.0 parts glycerol, 9.0 parts invert sugar, and 88.0 parts water to absorb 35% solution based on dry fiber weight. It is rolled loosely, let stand for 24 hours, and then passed through a supercalender stack which has alternate rolls of metal heated by 80 lbs. gage steam, and unheated paper covered rolls, under sufficient pressure to polish and transparentize the sheet. The starch is a corn starch that is oxidized to low viscosity. The polyvinyl alcohol is of the hot water soluble type with a specific viscosity as a 4% solution at 25° C. of 2.6 centipoises and a saponification value of 11.2. The product has a resistance to turpentine of more than 8 hrs. and a wet tensile strength of 4.9 lbs. The turpentine resistance and wet strength of the same sheet to which the glycerol-invert sugar is applied to the extent of 8 parts, based on dry fiber weight, instead of the starch composition are 2 hrs. and 0.61 lb., respectively. The turpentine resistance test is made as follows: cut 16 samples 2" square each from representative areas of each sample of paper. These are given a sharp bend ¼" from each end to facilitate handling. They are then arranged on a large sheet of smooth white paper which serves as a tell-tale. One inch squares of blotting paper (kerosene absorption 350%) 0.050" thick are placed on each test piece, then 0.4 cc. of anhydrous turpentine, colored with a red dye (2.0 parts oil-soluble red dye to 98.0 parts turpentine) is applied to the blotting paper square and a 1" cube of brass is placed onto this square of blotting paper. Test sheets with blotting paper and brass cubes in position are pulled along the surface of the tell-tale paper to new positions at intervals in order to determine time in which the tell-tale sheet is marked by the colored turpentine. The turpentine resistance is expressed in minutes as a mean of all 16 tests. Samples that show no penetration at 480 minutes are treated with an additional 0.2 cc. colored turpentine and this is repeated until completion of test. For wet tensile strength tests 8 strips 0.5 x 5.1" are cut from the sheet, one set across the grain and the other with the grain. They are submerged in distilled water 16 minutes at 25° C. and excess water is removed from the surface of each strip just before testing by means of blotting paper. The tensile strength is determined on an inclined plane type of Scott tensile tester which records strength and stretch automatically at intervals of approximately 0.01 lb.

*Example III*

A web of paper is formed from a mixture of 70 parts of ground wood and 30 parts of unbleached sulfite fiber into a sheet of 34 lbs. for a 24 x 36 x 500 ream. The dry sheet is sprayed on one side with a solution comprising a medium boiling starch 8 parts, dimethylol ammonium sulfamate 3.0 parts, ammonium nitrate 1.0 part, and 88.0 parts water in sufficient amount to give 8% starch based on the fibers. The sheet is then pressed against a heated, smooth metal cylinder by means of a canvas felt for 30 seconds. The cylinder is heated by free flowing steam at a temperature of approximately 100° C. The sheet has 2.8 times the wet strength of a sheet given the same heat treatment and treated with starch only.

*Example IV*

A 240 lb. cardboard is coated on one side to the extent of 12 lbs. solids per ream. It is dried by passing in a stretched condition through an oven heated with dry steam which is released from a pressure of 50 lbs. gage. Time of passing through the steam chamber is 20 seconds and the moisture content of the sheet on emerging is 4%, based on total weight. It is supercalendered to develop gloss and smoothness. It resists 4100 wet rubs. The coating consists of 100 parts (dry weight) of a high test clay, 20 parts starch, 1.6 parts dimethylol biuret, 6.0 parts diammonium hydrogen phosphate, and 120 parts of water. The clay is a high test coating clay of high whiteness. The starch is a cornstarch oxidized to a medium viscosity. The dimethylol biuret is made by adding 1 mol biuret to 2 mols formaldehyde as a neutral 37% solution in water and methanol, holding at 50 to 60° C. for 1 hr., letting stand at room temperature 10 hrs., adding hot water to dissolve the crystals that are formed and cooling promptly by adding enough cold water to make a 10% solution.

A coating made on the same paper from the same clay containing 15 parts casein and 0.60 part 37% solution formaldehyde resists 3400 wet rubs.

*Example V*

A 60 lb. sheet is made from 50 parts bleached rag and 50 parts high alpha bleached sulfite pulp with 0.25% rosin size. After passing over a suitable number of steam heated drying cylinders to reduce the moisture to 60% it is passed through a tub-size press where it is treated on both sides with enough coating composition to absorb 5% solids based on dry fiber weight. It is then dried to 5% moisture by passing over steam-heated cylinders that are heated with 5 lbs. gage steam pressure and is then passed through the regular calender stack. The treating solution consists of cornstarch, 5.4 parts; polyvinyl alcohol, 0.6 part; dimethylol hexamethylenediamine, 0.6 part; ammonium bromide, 2.4 parts; and water, 91.0 parts. The starch is a cornstarch treated by an enzyme to a medium viscosity. The polyvinyl alcohol is of the hot water-soluble type with viscosity as 4% aqueous solution at 25° C. of 62 centipoises and with a saponification value of 21. The dimethylol hexamethylenediamine is made by neutralizing 1 mol hexamethylenediamine with acetic acid, adding this gradually to 2 mols formaldehyde which has been neutralized previously with sodium hydroxide, heating at 50° to 60° C. for 1 hr., allowing to stand for 12 hrs. at room temperature and diluting with cold water to a 10% solution. The paper thus treated has excellent writing and printing properties and has 1.9 times the wet strength of a corresponding paper made from all but one of the same ingredients (dimethylol hexamethylenediamine) and under the same conditions.

Example VI

A water leaf web of 30 lbs. ream weight is formed from a Mitscherlich grade of bleached sulfite wood fibers that are beaten to a condition to form a greaseproof paper with density of 17 lbs. per mil per ream. After passing over enough drying cylinders to reduce the moisture content to 45% the sheet is passed between tub-size rolls where both sides are treated with a solution at 35° C. of 6.0 parts starch, 0.4 part polyvinyl alcohol, 0.6 part trimethylol-melamine, 1.0 part ammonium sulfate, and 92.3 parts water; and it is then squeezed sufficiently to leave 2% starch in the sheet based on fiber weight. The sheet then passes over more drying cylinders that are heated by 10 lbs. gage steam pressure until the moisture content is 7%. It is then moistened further by brushing with enough of a solution containing 3.0 parts glycerol, 9.0 parts invert sugar, and 88.0 parts water to absorb 35% solution based on dry fiber weight. It is rolled loosely, allowed to stand for 24 hrs., and then passed through a super-calender stack which has alternate rolls of metal heated by 80 lbs. gage steam pressure and unheated paper covered rolls under sufficient pressure to polish and transparentize the sheet. The product has a resistance to turpentine of more than 8 hrs. and a wet tensile strength of 5.7 lbs. The turpentine resistance and wet strength of the same sheet to which the glycerol-invert sugar is applied to the extent of 8 parts based on dry fiber weight instead of the starch composition are 2 hrs. and 0.61 lbs., respectively.

Example VII

A web of paper is formed from a mixture of 70 parts ground wood and 30 parts unbleached sulfite into a sheet of 34 lbs. for a 24 x 36 x 500 ream. The dry sheet is sprayed on one side with a solution comprising 8 parts of a medium boiling starch, 1.0 part trimethylol-melamine, 0.5 part ammonium nitrate, and 90.5 parts water in sufficient amount to give 8% starch based on the fibers. The sheet is then pressed against the heated, smooth metal cylinder by means of a canvas felt for 30 seconds. The cylinder is heated by free flowing steam at a temperature of approximately 100° C. The sheet has three times the wet strength of a sheet given the same heat treatment and containing starch only.

Example VIII

A 240 lb. cardboard is coated on one side to the extent of 12 lbs. solids per ream. It is dried by passing in a stretched condition through an oven heated with dry steam which is released from a pressure of 50 lbs. gage. Time of passing through the steam chamber is 20 seconds and the moisture content of the sheet on emerging is 4%, based on total weight. It is supercalendered to develop gloss and smoothness. It resists 2900 wet rubs. The coating consists of 100 parts (dry weight) of chalk, 14.25 parts starch, 0.75 part polyvinyl alcohol, 0.8 part trimethylol-melamine, 6.0 parts ammonium chloride, and 122 parts water. The chalk is a commercial grade obtained in a sodium hydroxide recovery system which is used as a paste and which has an alkaline reaction (pH of coating slurry is 11.2). The starch is an oxidized cornstarch of medium viscosity. The polyvinyl alcohol is of the hot water-soluble type of intrinsic viscosity in a 4% aqueous solution at 25° C. of 15 centipoises and has a saponification value of 4. The trimethylol-melamine is the same as in Example I. The ammonium chloride has a pH of 6.3 as a 2% solution.

A coating made on the same paper board from the same chalk containing 15 parts of casein and 0.2 part of formaldehyde 37% solution resists 50 wet rubs. (0.2 part formaldehyde as 37% solution is the maximum tolerated by this coating.)

Example IX

A 60 lb. sheet is made from 50 parts bleached rag and 50 parts high alpha bleached sulfite pulp with 0.25% rosin size. After passing over a suitable number of steam heated drying cylinders to reduce the moisture to 50% it is passed through a tub-size press where it is treated on both sides with enough coating composition to absorb 5% solids based on dry fiber weight. It is then dried to 5% moisture by passing over steam heated cylinders that are heated with 5 lbs. gage steam pressure and is then passed through the regular calender stack. The treating solution consists of 5.4 parts of cornstarch, 0.6 part polyvinyl alcohol, 0.2 part trimethylol-melamine, 0.5 part ammonium nitrate, and 93.3 parts water. The starch is a cornstarch treated by an enzyme to a medium viscosity. The polyvinyl alcohol is a hot water-soluble type with an intrinsic viscosity of 62 centipoises in 4% aqueous solution at 25° C. and a saponification number of 21. The trimethylol-melamine is the same as that used in Example I. The ammonium nitrate has a pH of 6.5 as a 2% solution. This paper has 2.5 times the wet strength of the same base sheet treated with the same amounts of cornstarch and polyvinyl alcohol but without the trimethylol-melamine and ammonium nitrate.

Example X

A 50 lb. sheet of white, sized, clay-filled paper is coated on the wire side with a clay slurry to the extent of 4.0 lbs. solids per ream. It is dried by passing the coated side over the smooth surface of a heated metal cylinder for 30 seconds, using a canvas felt to press the sheet against the cylinder surface which is heated by 20 lbs. gage steam pressure. The product is supercalendered to a high gloss which is fingerprint proof. It gives a minimum coating pick of 7 and a fiber pick of 9 and it withstands more than 4000 wet rubs. The coating composition consists of 100 parts of a high grade coating clay, 20 parts of a cornstarch oxidized to low viscosity, 1.0 part trimethylol-melamine, 1.0 part ammonium sulfate, and 150 parts water; and it has a #10 cup viscosity of 34 seconds at 25° C. The #10 cup viscosity is determined on the coating slurry by filling a standard viscosity cup of 100 cc. volume with an orifice of 1.0 mm. and taking the time required to deliver the first 50 cc. Wet rubs are determined by applying .10 drops of distilled water to the coating surface and rubbing with the finger in approximately 1" strokes. A completed stroke which has returned to the starting point is counted as 1 rub. The loosening of pigment is taken as the end point. The trimethylol-melamine is prepared by adding 1 mol of 2,4,6-triamino-1,3,5-triazine to 4.5 mols formaldehyde as a neutralized 35% solution in water and methanol, heating on a water bath for 20 minutes to dissolve the melamine, cooling rapidly to stop the reaction and then diluting gradually with hot water until a 2% solution is obtained.

A similar sheet coated in the same manner with the same composition, except that the trimethylol-melamine is omitted, gives a minimum coating pick of 7, a fiber pick of 8, and the coating is removed by one wet rub.

The webs may be prepared by any of the well-known methods for preparing webs from cellulosic fibers of paper-making length, such as on a cylinder mold, a Fourdrinier, or a Harper Fourdrinier; and they may be prepared in any thickness of single or multiple layers and at densities from about 20 lbs. per mil to 4 lbs. per mil for a 24 x 36 x 500 ream. They may be made from fibers alone in highly beaten or slightly beaten form or they may contain mineral fillers, sizes, waxes, etc.

The fibers may be made from wood by the sulfate, sulfite, soda, or ground wood pulp method in bleached or unbleached form. Or they may be made from cotton rag, linen rag, flax, ramie, jute, straw, pineapple, *Musa textilis*, or banana in bleached or unbleached form.

The starch compositions are prepared by making a paste from starch with water at sufficient temperature to swell and disperse the starch granules, blending the starch with modifiers that are in aqueous solution and then adding solutions of insolubilizer and catalyst, and aqueous slurries of pigments if these are used. The starches may be from corn, potato, wheat or tapioca and they may be reduced to any desired viscosity by oxidation or enzymes. They may be of such viscosities as the thin boiling, medium boiling, and heavy boiling starches.

The starch compositions are applied to the web of paper-making fibers by any of the well known means such as spray, application with roll, tubsize press or special rolls. These compositions should be in as high concentration of solids as is practicable, and they are preferably applied at room temperature.

Heating to effect insolubilization is best accomplished during the drying step. The freshly treated web is dried at elevated temperature to a moisture content in the sheet of 4 to 20% or until the wet strength is at least 50% greater than that of the same sheet material treated under the same conditions with the same amount of polyvinyl alcohol but without the addition of the N-methylol aliphatic nitrogen containing compound and the ammonium salt. In this drying step any temperature above 65° C. has been found to be operative for producing the insolubilizing reaction. The upper temperature limits from the point of view of operativeness depend upon the degradation temperature of the compounds in the treating composition. Temperatures between 100° and 125° C. are, however, preferred as steam at temperatures in excess of 125° C. is relatively expensive. It is essential that the heating step be carried out in the presence of moisture and that the moisture content of the paper at the termination of the heating be not less than 4%. Heating to a moisture content of less in amount than 4% produces a brittle product and destroys the qualities desired and obtained by the use of this invention. The time of heating should be such that there is an insolubilizing reaction between the starch and the water-soluble N-methylol aliphatic nitrogen-containing compound. For successful operation of the drying step there should be present in the paper at the start of the heating period an amount of water equivalent to at least 30% of the total solids. Where it is inconvenient to heat the paper to a temperature of 65° C. or above for a sufficient time to dry the sheet, the sheet may be dried at a lower temperature, then remoistened with enough water to make at least 30% moisture (based on sheet weight) and then heated at 65° C. or above until the moisture content is about 5%.

The polyvinyl alcohols should be of the water-soluble type with a specific viscosity as a 4% aqueous solution at 25% C. of 1 to 100 centipoises and a saponification value below 350, or low enough to insure solubility in water. They are tough, water-white, resin-like materials which are usually obtained by the hydrolysis of polyvinyl esters such as polyvinyl acetate. They are soluble to insoluble in cold water, but all of them are soluble in hot water and remain dissolved when the solution is cooled. The term "polyvinyl alcohol" is used herein and in appended claims to designate generically pure polyvinyl alcohol and also such partial derivatives thereof that contain a sufficient number of free hydroxyl groups to render the composition soluble in water.

Various softeners may be applied to the starch composition or to the sheet after the starch compositions have been applied, such as formamide, ethanol formamide, ethanol acetamide, glycerol, polyglycerol, polyglycols, invert sugars, certain hygroscopic salts, such as sodium lactate, and the higher fat alcohol sulfates. The ratio of softeners to starch may vary in a wide range but 2 to 20% based on starch represents the preferred range.

Calendering may be effected on the paper machine calender stack and where special calender treatments are necessary by passage through a supercalender stack.

The ratio of polyvinyl alcohol that may be added to the starch may vary from 1 part polyvinyl alcohol to 99 parts starch to 25 parts polyvinyl alcohol to 75 parts starch.

The ratio of starch to paper may vary as much as starch 0.8 to 10.0 parts per 100 parts fibers. The preferred limits of starch to fibrous ingredient in the paper web are: starch 1.6 to 8.0 parts per 100 parts fibers.

The ratio of water-soluble N-methylol aliphatic nitrogen-containing compounds may vary from 1.0 to 25.0 parts per 100 parts starch. The preferred limits of nitrogenous methylol compound to starch are: nitrogenous methylol compound 4.5 to 8.0 parts per 100 parts starch.

The ratio of ammonium salt may vary from 4.0 to 100.0 parts per 100 parts starch.

Typical water-soluble N-methylol aliphatic nitrogen containing compounds and their methods of preparation have been given in the examples. Compounds that are useful are those made by reacting formaldehyde, paraformaldehyde, trioxane, or compounds yielding formaldehyde with amines, amides or derivatives of these under conditions that will produce methylol derivatives that are soluble to at least some extent in water. Typical examples of aliphatic amines and amides are: melamine, urea, thiourea, biuret, monobutyl urea, formamide, acetamide, guanyl urea sulfate, hexamethylene diamine, hexamethylenediamide sulfamate, ethanolamine, monomethylamine, monoethylamine, diethylamine and derivatives of these. Ammonium, sodium, potassium or calcium sulfamates may also be used. The preferred methods of preparation consist in neutralizing the acidity of the formaldehyde solution, neutralizing the reactive nitrogen containing compound if it is strongly alkaline, and then mixing the reactants in proper mol ratios at a slightly elevated temperature. In some cases the concentrated forms of formaldehyde, such as paraformaldehyde, are more useful than the 37% solution of formaldehyde for obtaining high yields of the methylol compound. Dimethylolurea is prepared by treating 2 mols formaldehyde as a neutral 37% solution in water and methanol with 1 mol urea to form a water-white product that is freely soluble in water and is stable as a 10% aqueous solution for several weeks at room temperature.

The preferred methylol-melamine is prepared by adding 1 mol of 2,4,6-triamino-1,3,5-triazine (melamine) to 3 mols formaldehyde as a 35% solution of formaldehyde in water and methanol which has been adjusted to a pH of 3.5 to 6.2, heating at 80° C. for 15 minutes and cooling rapidly to stop the reaction by diluting with cold water until a clear solution is obtained of a concentration below 6% methylol-melamine. The product may be used directly or before the dilution stage it may be dried at low temperature to a white powder. The white powder is non-hygroscopic and dissolves in water at 80° C. to make a clear solution that remains clear when cooled at concentrations below 6%. Slight alterations in this method may be used to obtain more complete reaction without rendering the product insoluble at concentrations below 6%, such as by cooling rapidly without dilution after the 15 minute heating period, letting stand at room temperature 12 hours, diluting with hot water and cooling.

If the pH of the formaldehyde solution is below 3.5 the reaction is not so readily controlled and products may be obtained that are insoluble in water. If the pH of the formaldehyde solution is above 7.0 the product tends to be insoluble at concentrations below 6% unless acid is added to a pH of not greater than 3.0. Or if the temperature of heating is increased much beyond 80° C. or if the time of heating is extended much beyond 15 minutes, such as 30 to 40 minutes, the product is hygroscopic, forms clear solutions at 25 to 50% concentrations and precipitates on further dilution in cold or hot water. The preferred product is soluble in water at concentrations below 6%, is readily blended with other ingredients in the paper-treating compositions, is more efficient than the type which precipitates on dilution in water, and can be handled with greater ease.

Methylol-melamine compounds are also useful that contain lower or higher ratios of methylol groups, such as monomethylol-melamine and up to as many methylol groups as can be added without making a water-insoluble product. At least a slight degree of water solubility is essential to insure the reaction between the methylol-melamine and the starch.

The pigments may be clay, chalk, calcium sulfite, titanium dioxide, lithopone, low hiding pigments and high hiding pigments extended with mineral fillers; except that mineral fillers such as calcium sulfate, are not useful for application to the web-forming ingredients before web formation because of solution losses in the large amounts of water involved.

The ammonium salts of mineral acids such as hydrochloric, nitric, sulfurous, sulfuric, persulfuric, and phosphoric acids are operative in this reaction; e. g., ammonium chloride, ammonium nitrate, ammonium sulfate, ammonium persulfate, and ammonium phosphate. The ammonium salts of a few strong organic acids such as oxalic, formic, and acetic acids may be used. The 2% aqueous solution of the above ammonium salts should have a pH of not lower than 6.1. Ammonium chloride catalyst is preferably used for compositions where color is of no importance or for compositions containing alkaline pigments. It causes more discoloration on aging than ammonium sulfate, nitrate or phosphate. These compounds are thought to have a catalytic effect.

The preferred limits of ammonium salt to starch are: ammonium salt 8 to 20 parts per 100 parts starch.

When the paper product produced by this process is to be used as a paper towel, it is preferred that the heating and drying step be terminated when the moisture content in the paper web is in equilibrium with air at 25° C. and not less than 50% relative humidity.

The products are useful as printing papers, food wraps, bags, liners for boxes, cartons, and many uses for packaging materials that require high wet strength and resistance to greases, fats or oils.

It is apparent that many widely different embodiments of this invention may be made without departing from the spirit and scope thereof and therefore it is not intended to be limited except as indicated in the appended claims.

We claim:

1. A paper web containing starch together with polyvinyl alcohol in an amount within the range of 1 to 25 parts of polyvinyl alcohol per 100 parts of the mixture of starch and polyvinyl alcohol, said starch and polyvinyl alcohol being insolubilized by reacting same with a water-soluble N-methylol aliphatic nitrogen-containing compound in an amount of between 1 and 25 parts per 100 parts of starch.

2. The process which comprises treating a paper web with an aqueous starch dispersion and containing a water-soluble methylol-melamine in an amount of from 1 to 25 parts per 100 parts of starch, a polyvinyl alcohol in an amount of from 1 to 25 parts of polyvinyl alcohol to 75 parts of starch and an ammonium salt of a mineral acid, and then heating said treated paper web to such a degree as to cause an insolubilizing reaction between the starch and the methylol-melamine.

3. A paper web containing starch together with polyvinyl alcohol in an amount of from 1 to 25 parts polyvinyl alcohol to 75 parts starch, said starch and polyvinyl alcohol being insolubilized by reacting same with a water-soluble methylol-melamine in an amount of from 1 to 25 parts per 100 parts of starch.

4. The product of claim 3 characterized in that the water-soluble methylol-melamine is trimethylol-melamine.

5. The product of claim 1 characterized in that the water-soluble N-methylol aliphatic nitrogen-containing compound is dimethylol urea.

6. The product of claim 1 characterized in that the water-soluble N-methylol aliphatic nitrogen-containing compound is dimethylol hexamethylenediamine.

GEORGE L. SCHWARTZ.
JOSEPH F. WALKER.